(12) United States Patent
Uphus et al.

(10) Patent No.: US 7,354,188 B2
(45) Date of Patent: Apr. 8, 2008

(54) GEAR PUMP HAVING INPUT AND OUTPUT SCREW SHAFTS WITH A DECREASING FLIGHT DEPTH TOWARD A GEAR SECTION IN TRANSFER MIX AREAS

(75) Inventors: Reinhard Uphus, Hannover (DE); Olaf Skibba, Hannover (DE)

(73) Assignees: Berstorff GmbH, Hannover (DE); VMI - AZ Extrusion GmbH, Munich (DE)

( * ) Notice: Subject to any disclaimer, the term of this patent is extended or adjusted under 35 U.S.C. 154(b) by 0 days.

(21) Appl. No.: 10/576,809

(22) PCT Filed: Oct. 19, 2004

(86) PCT No.: PCT/EP2004/011789

§ 371 (c)(1),
(2), (4) Date: Feb. 16, 2007

(87) PCT Pub. No.: WO2005/039859

PCT Pub. Date: May 6, 2005

(65) Prior Publication Data

US 2007/0237023 A1    Oct. 11, 2007

(30) Foreign Application Priority Data

Oct. 22, 2003  (DE) ............................... 103 48 985

(51) Int. Cl.
*B29C 47/50*  (2006.01)
(52) U.S. Cl. ........................................ 366/77; 366/272
(58) Field of Classification Search ................. 366/77, 366/79–81, 83–85, 301, 318–324, 272; 425/204, 425/208, 209; 418/61.1, 201.1
See application file for complete search history.

(56) References Cited

U.S. PATENT DOCUMENTS 2,767,437 A * 10/1956 Marshall ................. 264/211.11

(Continued)

FOREIGN PATENT DOCUMENTS

DE    29 05 717 A1    8/1980

(Continued)

OTHER PUBLICATIONS

International Search Report dated Feb. 7, 2005 including PCT/ISA/237 (Twelve (12) pages).

*Primary Examiner*—Charles E. Cooley
(74) *Attorney, Agent, or Firm*—Crowell & Moring LLP

(57) ABSTRACT

The invention relates to a gear pump which is suitable for delivering highly viscous materials. The aim of the invention is to provide a gear pump having a low-wear and low-maintenance bearing system, high output and good self-cleaning properties. For this purpose, the gear pump according to the invention comprises a housing, a gear section comprising a sun wheel and a plurality of stationarily mounted planet wheels, an input screw section comprising an input screw shaft linked with the sun wheel in a rotationally fixed manner and an input transfermix area, and an output screw section comprising an output screw shaft linked with the sun wheel in a rotationally fixed manner and an output transfermix area. The screw shafts, in the transfermix areas, have flight depths that decrease toward the gear section. In the housing, flights are configured which extend in an opposite direction relative to the screw shafts, which have increasing diameters towards the gear section and which end each between the planet wheels.

16 Claims, 2 Drawing Sheets

U.S. PATENT DOCUMENTS

| | | | |
|---|---|---|---|
| 2,785,438 A * | 3/1957 | Willert | 366/81 |
| 4,289,409 A * | 9/1981 | Brand | 366/83 |
| 4,303,344 A | 12/1981 | Mueller | |
| 4,336,213 A * | 6/1982 | Fox | 264/40.1 |
| 4,642,040 A * | 2/1987 | Fox | 425/204 |
| 5,153,009 A * | 10/1992 | Voigt | 425/204 |
| 5,215,374 A | 6/1993 | Meyer | |
| 5,267,847 A * | 12/1993 | Bohm et al. | 425/145 |
| 5,304,054 A | 4/1994 | Meyer | |
| 5,310,256 A * | 5/1994 | Boden | 366/77 |
| 5,378,415 A * | 1/1995 | Gohlisch et al. | 264/40.1 |
| 6,264,447 B1 * | 7/2001 | Woodcock | 418/102 |
| 6,286,988 B1 * | 9/2001 | Hasse | 366/77 |
| 6,468,067 B1 * | 10/2002 | Ikegami | 425/209 |
| 6,531,079 B2 * | 3/2003 | Hepke | 264/102 |
| 6,799,881 B2 * | 10/2004 | Fischer | 366/80 |
| 6,974,310 B2 * | 12/2005 | Uphus | 417/205 |
| 7,040,870 B2 * | 5/2006 | Nicolas et al. | 417/53 |
| 7,290,923 B2 * | 11/2007 | Fischer et al. | 366/77 |
| 2005/0220919 A1 * | 10/2005 | Fischer et al. | 425/208 |
| 2007/0104815 A1 * | 5/2007 | Uphus | 425/208 |

FOREIGN PATENT DOCUMENTS

| | | |
|---|---|---|
| DE | 3133647 A1 * | 3/1983 |
| DE | 100 49 730 A1 | 4/2002 |
| DE | 101 50 627 A1 | 5/2003 |
| DE | 102 52 368 A1 | 5/2003 |
| EP | 0 642 913 B1 | 3/1995 |
| EP | 1801418 A1 * | 6/2007 |
| JP | 11-198214 * | 7/1999 |
| JP | 2006247917 A * | 9/2006 |
| SU | 1537560 A1 | 1/1990 |
| WO | WO 00/53390 A1 | 9/2000 |
| WO | WO 2005039859 A1 * | 5/2005 |

* cited by examiner

GEAR PUMP HAVING INPUT AND OUTPUT SCREW SHAFTS WITH A DECREASING FLIGHT DEPTH TOWARD A GEAR SECTION IN TRANSFER MIX AREAS

BACKGROUND AND SUMMARY OF THE INVENTION

The invention relates to a gear pump which is suitable for delivering highly viscous materials, such as caoutchouc mixtures.

Gear pumps permit a high output pressure while the stress to the material is low. The gear section is often used in combination with an extruder screw. German Patent document DE 100 49 730 A1 shows such a gear pump, in the case of which the material is supplied to a gear section with a planetary gear train by way of an input screw. The planetary gear train has a ring gear fixed to the casing and has four planet wheels which are rotatably disposed on a planet carrier. The planet carrier, in turn, is rotatably disposed in the ring gear and has four separating walls extending radially from a central basic body to the toothing of the ring gear, which separating walls form an inlet chamber element narrowing in the delivery direction and a pressure chamber element increasing in the delivery direction. Furthermore, in addition to this embodiment with the toothed ring gear and the non-toothed sun wheel with the planet carrier, the reverse arrangement is also mentioned, which requires higher expenditures, is rated to be more complex and has a toothed sun wheel and a ring gear operating as a function part with at least one sealing area, in the case of which the ring gear with the planet carrier can stand still.

In the case of the gear pump of German Patent document DE 100 49 730 A1, a high pumping capacity and self-cleaning is achieved by means of the planetary gear train. However, the bearing of the planetary gears on the planet carrier will then present problems when roller bearings are to be used because they cannot be sealed off sufficiently. Furthermore, the additional planet carrier with the sealing walls requires higher manufacturing expenditures and higher manufacturing costs.

European Patent document EP 0 642 913 B1 shows a single-shaft screw having two meshing gears, one of which is fitted onto the screw shaft. The gears are disposed to be fixed to the casing, in which case the bearing points are lubricated by the delivered highly viscous material. The pump casing is form-lockingly connected with the screw housing and consists of two figure-eight sealing disks which adjoin the faces of the two gears in a flush manner and are provided with openings for the passage of the screw shaft and the axle of the countergear. One product passage window respectively is provided on the sealing plates or on the screw housing at the level of the sealing plates, which product passage window is open toward the screw space. Such a gear pump permits a drive of the shaft gear by way of the screw shaft and a housing-fixed bearing of the countergear. However, the self-cleaning effect is low.

International Patent publication WO 00/53390 A1 shows a similar gear pump, in the case of which material is fed in the radial direction to two mutually meshing gears and is removed by way of an extruder screw connected with one of the gears. Here, a transfer mix area is provided in a starting area of the extruder screw. In this transfer mix area, a flight constructed in the extruder housing and extending in a helical manner and in the opposite direction with respect to the helical shape of the screw shaft decreases in its cross-section in favor of the enlarging screw shaft chamber. Such a transfer mix area, in addition to the delivery effect, causes a mixing of the highly viscous material. The material is fed from a common outlet of the mutually meshing gears into the flight of the transfer mix area and transferred into the enlarging screw shaft chamber. However, this requires a radial feeding of the material to be delivered. Furthermore, at most, an insufficient self-cleaning can be achieved.

It is an object of the invention to create improvements with respect to known gear pumps and particularly permit a good self-cleaning and a low-wear and low-maintenance bearing.

This object is achieved by means of a gear pump according to the invention. Preferred further developments are described and claimed herein.

According to the invention, an at least three-section gear pump is therefore provided which has a feeding and an output screw section, as well as a center gear section. The center gear section permits a high pump capacity and adjusting precision and prevents a reaction of the output section to pressure fluctuations of the input. The gear section according to the invention has planet wheels fixed to the housing and a sun wheel which is connected with the screw shafts in a rotationally fixed manner. In contrast to German Patent document DE 100 49 730 A1, the planet wheels, which are disposed in a fixed manner in the housing, can be disposed in the housing with low maintenance and low wear, particularly with roller bearings. The transfer mix areas in the input and output extruder achieve a mixing, in addition to the delivery.

For achieving a larger cross-section, the flights can be connected in the inlet area and outlet area respectively by way of connection ducts extending essentially in the circumferential direction.

In the following, the invention will be explained as an embodiment by means of the attached drawings.

DETAILED DESCRIPTION OF THE DRAWINGS

Figure 1:
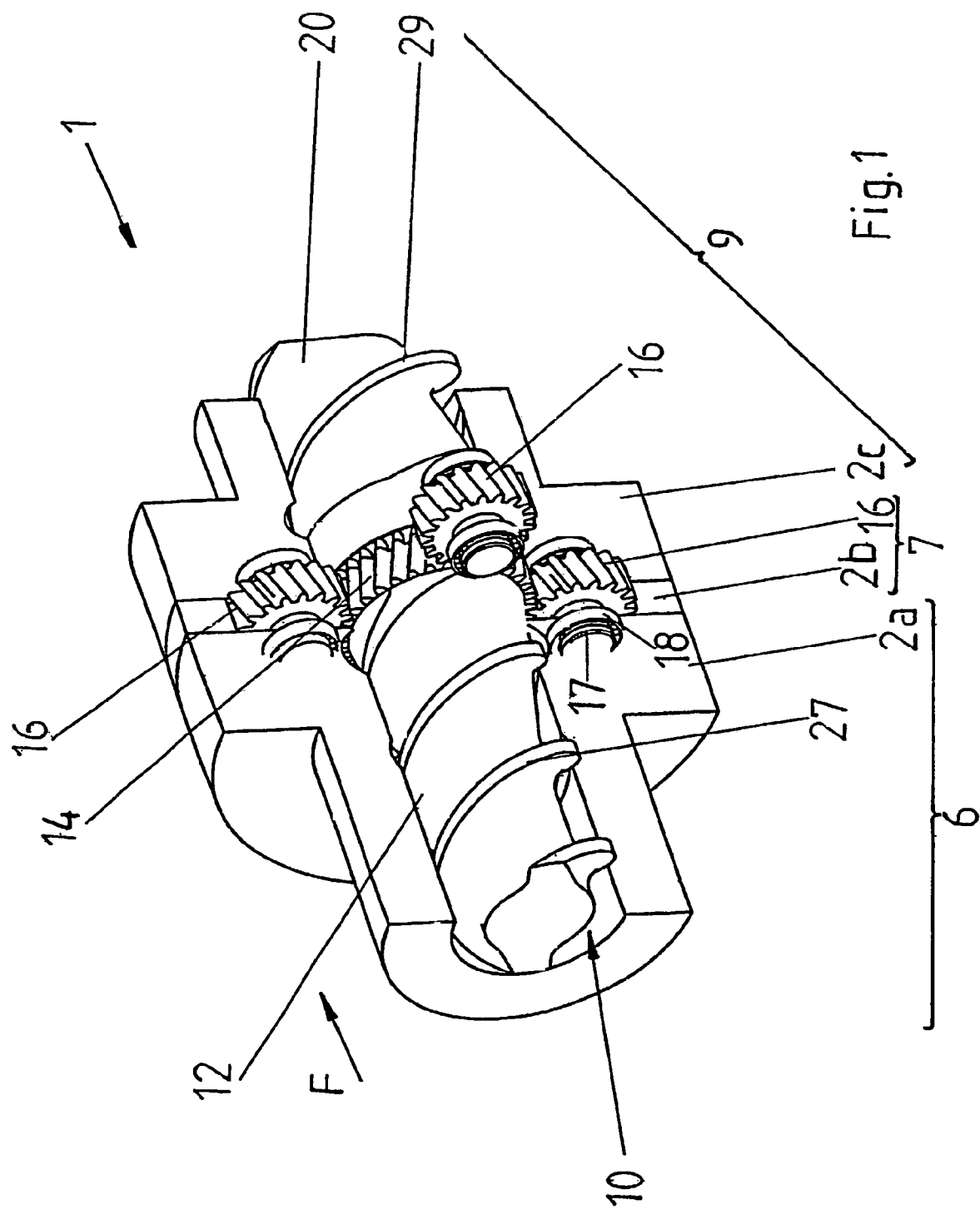
FIG. 1 is a perspective representation of a gear pump according to the invention with a cut housing.
Figure 2:
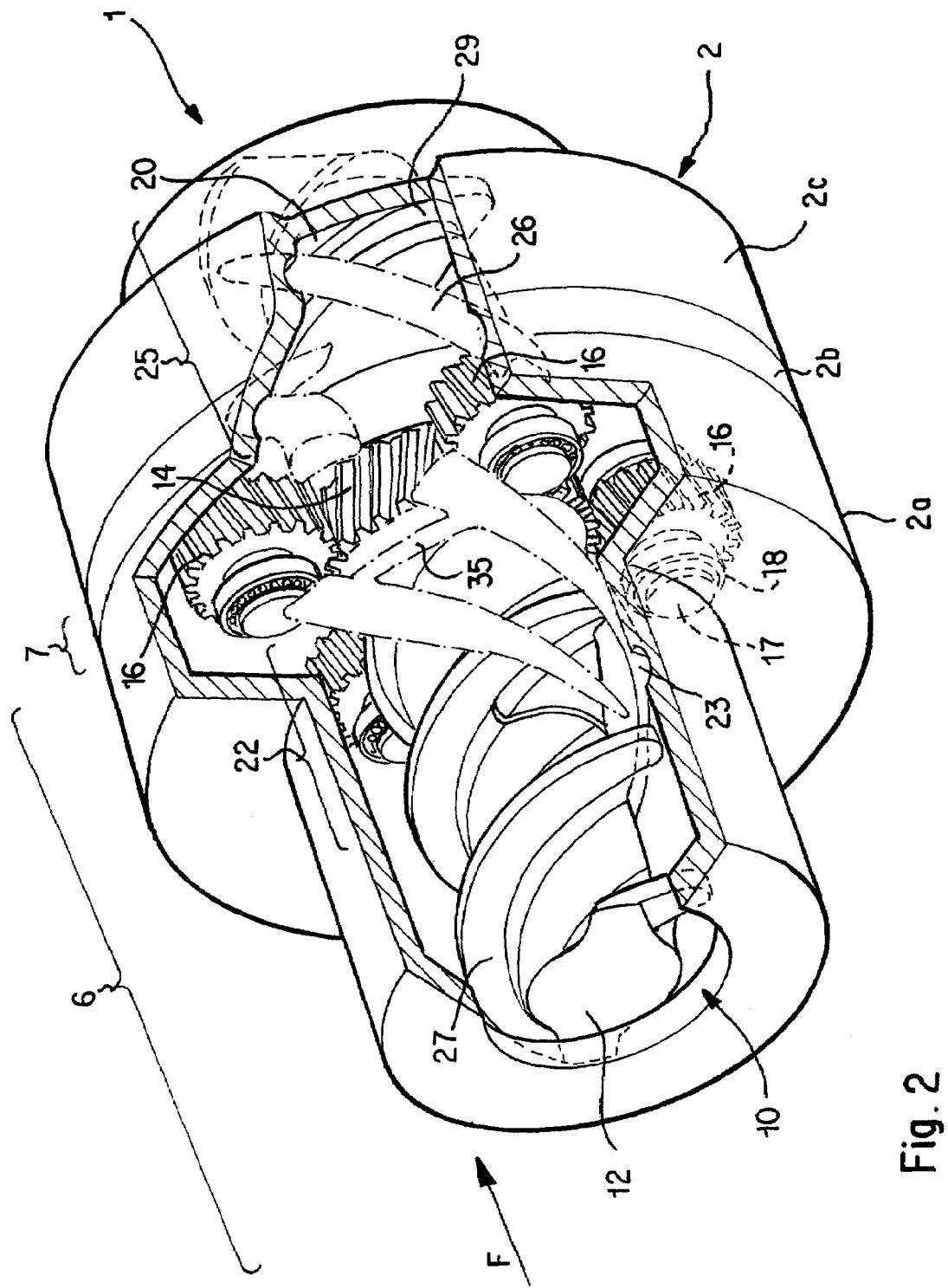
FIG. 2 is a representation corresponding to FIG. 1 as a view through the housing.

A gear pump 1 has a housing 2 with a first housing part 2a, a central second housing part 2b and a third housing part 2c. The gear pump 1 is divided in series in the delivery direction F into an input extruder 6, a gear section 7 and an output extruder 9.

In the housing 2, a continuous housing bore 10 is constructed into which an input screw shaft 12 is inserted. A sun wheel 14 of the gear section 7 is placed on the input screw shaft 12, which sun wheel 14 meshes with four planet wheels 16. Fixed to the housing, the planet wheels 16 with their axles 17 are disposed in roller bearings 18. Here, the roller bearings 18 are advantageously inserted in the first housing part 2a and the third housing part 2c respectively. An output screw shaft 20 is, in turn, connected in a rotationally rigid manner with the sun wheel 14 and the input screw shaft 12.

According to the invention, transfer mix areas 22 and 25 adjoining the gear section 7 are constructed in the input extruder 6 as well as the output extruder 9. In the transfer mix areas 22 and 25, four fights 23 and 26 extend in the opposite direction to the slope of the helical configurations 27 and 29 respectively of the screw shafts 12, 20 toward the gear section 7 and end in circumferential areas of the sun wheel 14 between the planet wheels 16. In this case, the flight depth of the input screw shaft 12 and the output screw shaft 20 decreases in the direction of the gear section 7 while the cross-section of the flights 23 and 26 increases simultaneously. Here, the number of flights 23, 26 corresponds to the number of planet wheels 16, each feeding flight 23 discharging the delivered material directly in front of a planet wheel 16. The material is delivered in the circumferential direction in the second housing part 2b and, when the toothing of the planet wheel 16 engages in the toothing of the sun wheel 14, is discharged to a removing flight 26 of the transfer mix area 25 of the output extruder 9. Connection ducts may be constructed in the first housing part 2a and/or in the third housing part 2c. The connection ducts (one of which is illustrated schematically in the housing 2a by reference 35) mutually connect the flights of the input transfer mix area 22 and the flights 26 of the output transfer mix area 25, respectively.

The invention claimed is:

1. Gear pump for highly viscous materials, comprising:
   a housing;
   a gear section having a sun wheel and several planet wheels disposed to be fixed at the housing;
   an input screw section having an input screw shaft, which is rotationally fixedly connected with the sun wheel, and having an input transfer mix area; and
   an output screw section having an output screw shaft, which is rotationally fixedly connected with the sun wheel, and having an output transfer mix area;
   wherein, in the input and output transfer mix areas, the input and output screw shafts have a flight depth decreasing toward the gear section, and, in the housing, flights are formed which extend in an opposite direction relative to the flights of the screw shafts, the flights having increasing diameters toward the gear section, and each of the flights ending between the planet wheels.

2. The gear pump according to claim 1, wherein the planet wheels are disposed in roller bearings in the housing.

3. The gear pump according to claim 2, wherein the housing has a first housing part accommodating the input screw shaft, a second housing part surrounding the planet wheels and the sun wheel, and a third housing part accommodating the output screw shaft.

4. The gear pump according to claim 3, wherein the roller bearings of the planet wheels are received in the first housing part accommodating the input screw shaft and in the third housing part accommodating the output screw shaft.

5. The gear pump according to claim 3, wherein the screw shafts are mutually connected in a rotationally fixed manner, and the sun wheel is fitted onto one of the screw shafts.

6. The gear pump according to claim 3, wherein the gear section has four planet wheels, and the housing has four flights respectively in the transfer mix areas.

7. The gear pump according to claim 2, wherein the screw shafts are mutually connected in a rotationally fixed manner, and the sun wheel is fitted onto one of the screw shafts.

8. The gear pump according to claim 2, wherein the gear section has four planet wheels, and the housing has four flights respectively in the transfer mix areas.

9. The gear pump according to claim 1, wherein the housing has a first housing part accommodating the input screw shaft, a second housing part surrounding the planet wheels and the sun wheel, and a third housing part accommodating the output screw shaft.

10. The gear pump according to claim 9, further comprising connection ducts constructed in the first housing part and/or in the third housing part, which connection ducts mutually connect the flights of the input transfer mix area and the flights of the output transfer mix area respectively.

11. The gear pump according to claim 10, wherein flights of the input transfer mix area are spaced in the circumferential direction with respect to the flights of the output transfer mix area.

12. The gear pump according to claim 1, wherein the screw shafts are mutually connected in a rotationally fixed manner, and the sun wheel is fitted onto one of the screw shafts.

13. The gear pump according to claim 1, wherein the flight depths of the screw shaft shafts disappear toward the gear section.

14. The gear pump according to claim 1, wherein the gear section has four planet wheels, and the housing has four flights respectively in the transfer mix areas.

15. The gear pump according to claim 14, wherein flights of the input transfer mix area are spaced in the circumferential direction with respect to the flights of the output transfer mix area.

16. The gear pump according to claim 1, wherein flights of the input transfer mix area are spaced in the circumferential direction with respect to the flights of the output transfer mix area.

* * * * *